(12) United States Patent
Lee et al.

(10) Patent No.: US 7,556,308 B2
(45) Date of Patent: Jul. 7, 2009

(54) SUNVISOR OF A VEHICLE

(75) Inventors: Chang-Seop Lee, Seoul (KR);
Dong-Nam Kim, Seoul (KR);
Joon-Seok Yoon, Seoul (KR)

(73) Assignee: QLT Co., Ltd., Seoul (KR)

( * ) Notice: Subject to any disclaimer, the term of this patent is extended or adjusted under 35 U.S.C. 154(b) by 0 days.

(21) Appl. No.: 11/915,224

(22) PCT Filed: Nov. 17, 2005

(86) PCT No.: PCT/KR2005/003897

§ 371 (c)(1),
(2), (4) Date: Nov. 21, 2007

(87) PCT Pub. No.: WO2006/126764

PCT Pub. Date: Nov. 30, 2006

(65) Prior Publication Data

US 2008/0197659 A1        Aug. 21, 2008

(30) Foreign Application Priority Data

May 23, 2005    (KR)    ............... 10-2005-0042902

(51) Int. Cl.
*B60J 3/00*    (2006.01)

(52) U.S. Cl. .................. 296/97.9; 296/97.1; 296/97.12; 296/97.13

(58) Field of Classification Search ................ 296/97.1, 296/97.9, 97.12, 97.13; 16/297, 321, 341, 16/342
See application file for complete search history.

(56) References Cited

U.S. PATENT DOCUMENTS 5,564,772 A * 10/1996 Miller .................... 296/97.12

FOREIGN PATENT DOCUMENTS

| JP | 2001-80355 | 3/2001 |
|---|---|---|
| KR | 1998-34955 | 8/1998 |
| KR | 1998-52324 | 10/1998 |
| KR | 2002-39170 | 5/2002 |

* cited by examiner

*Primary Examiner*—Lori L Lyjak
(74) *Attorney, Agent, or Firm*—Edwards Angell Palmer & Dodge LLP

(57) ABSTRACT

As of supporting the survivor to the vehicle body, the visor panel is adapted in relatively and easily be attached to and detached from the clip unit by using a push lock type clip unit. Moreover, when the support rod is detached from the clip unit, the visor panel is automatically positioned to shade the side window via a panel guide unit, thus optimizing the convenience of using the sunvisor.

18 Claims, 9 Drawing Sheets

[Fig. 1]
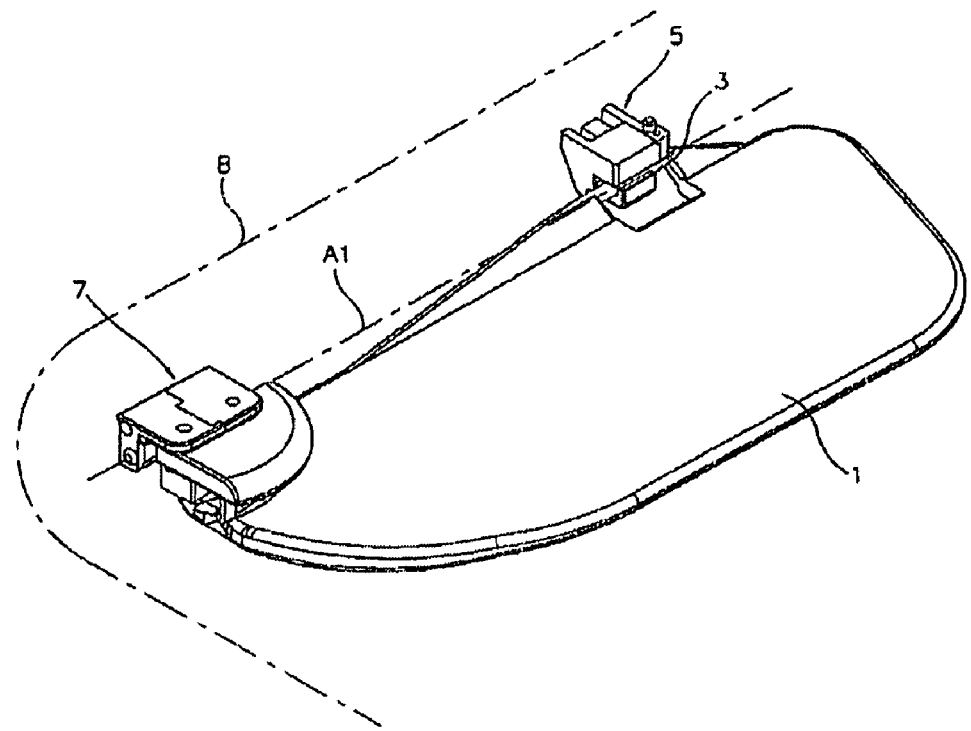
[Fig. 2]
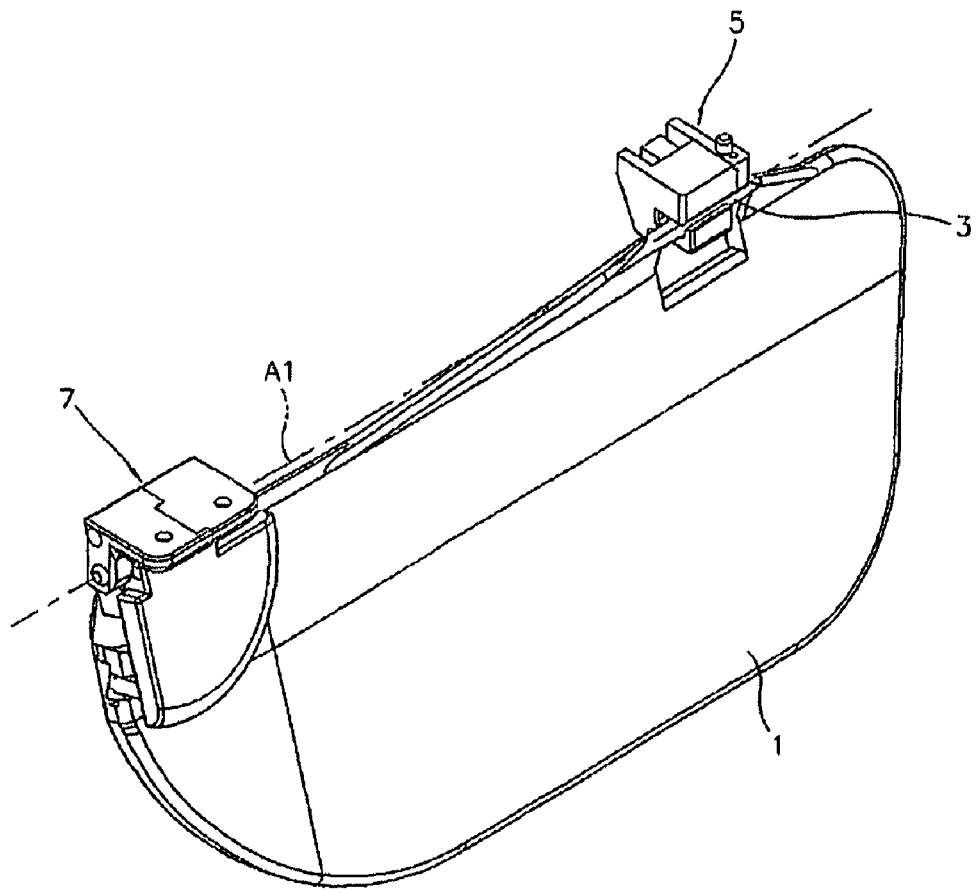

[Fig. 3]
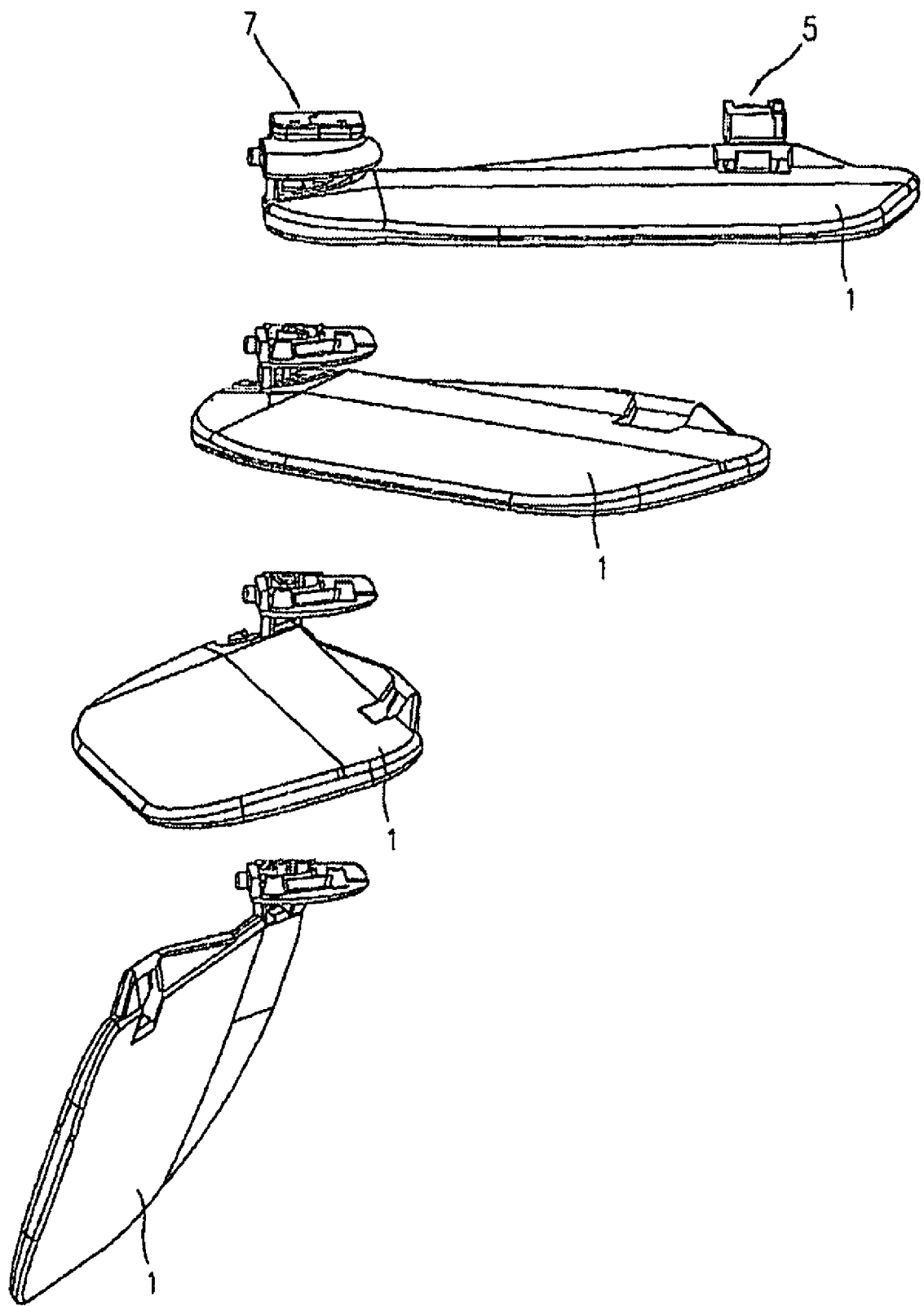

[Fig. 4]
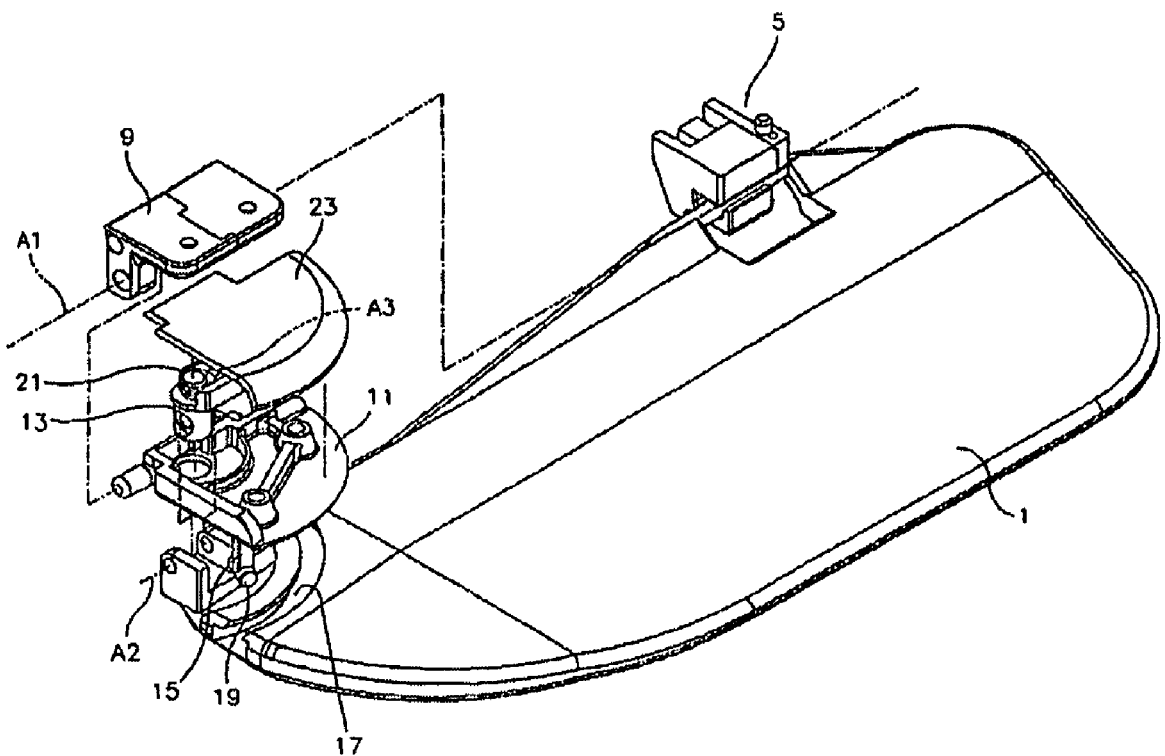

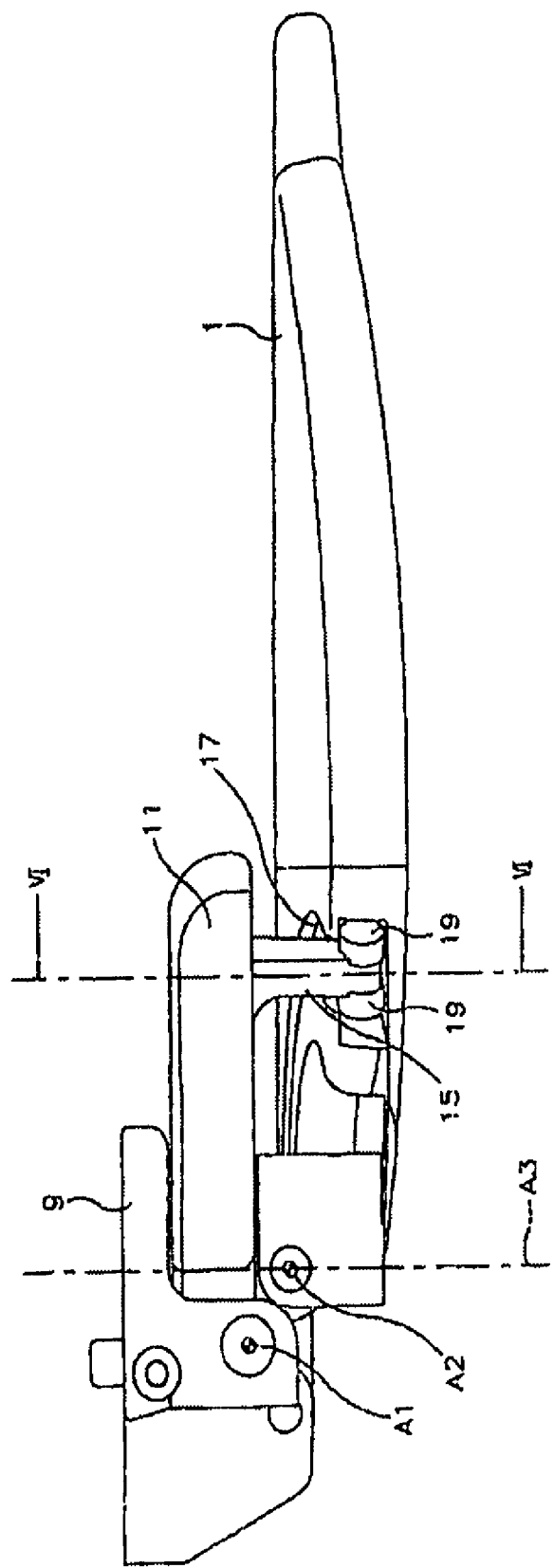
[Fig. 5]

[Fig. 6]
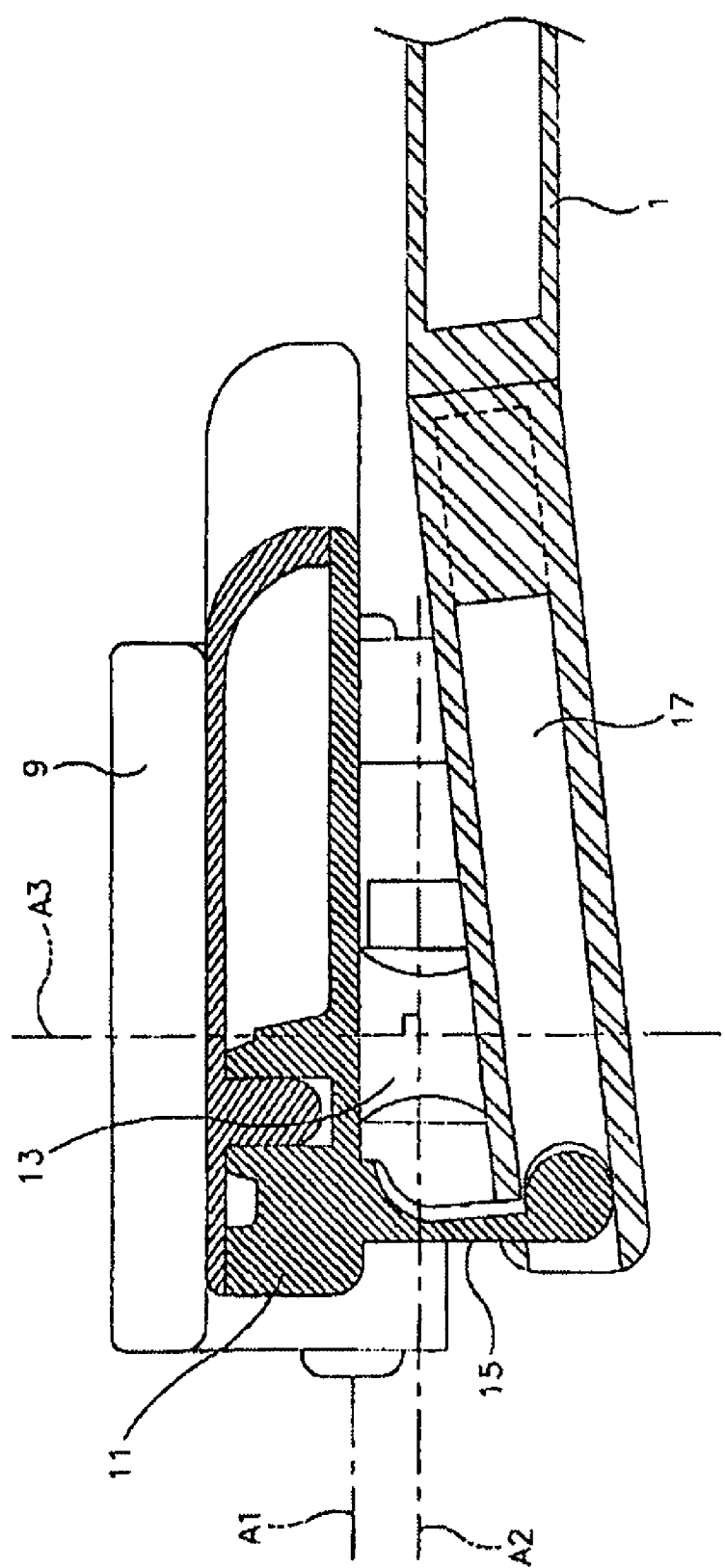

[Fig. 7]
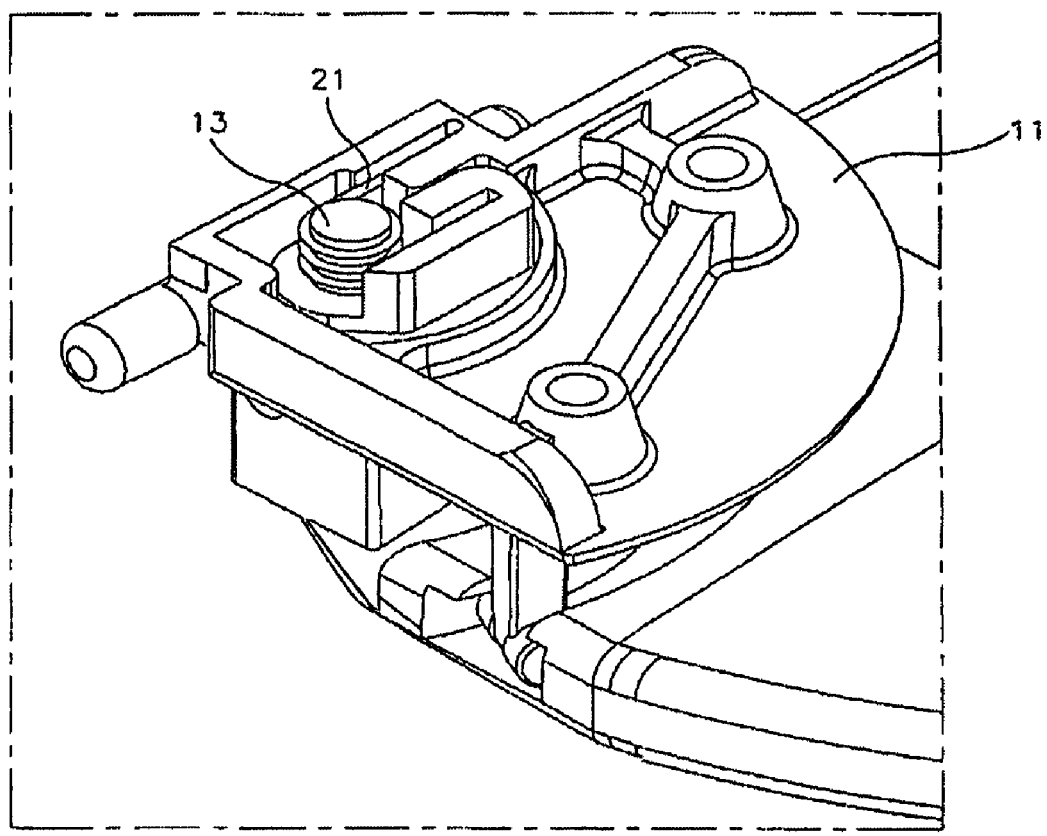
[Fig. 8]
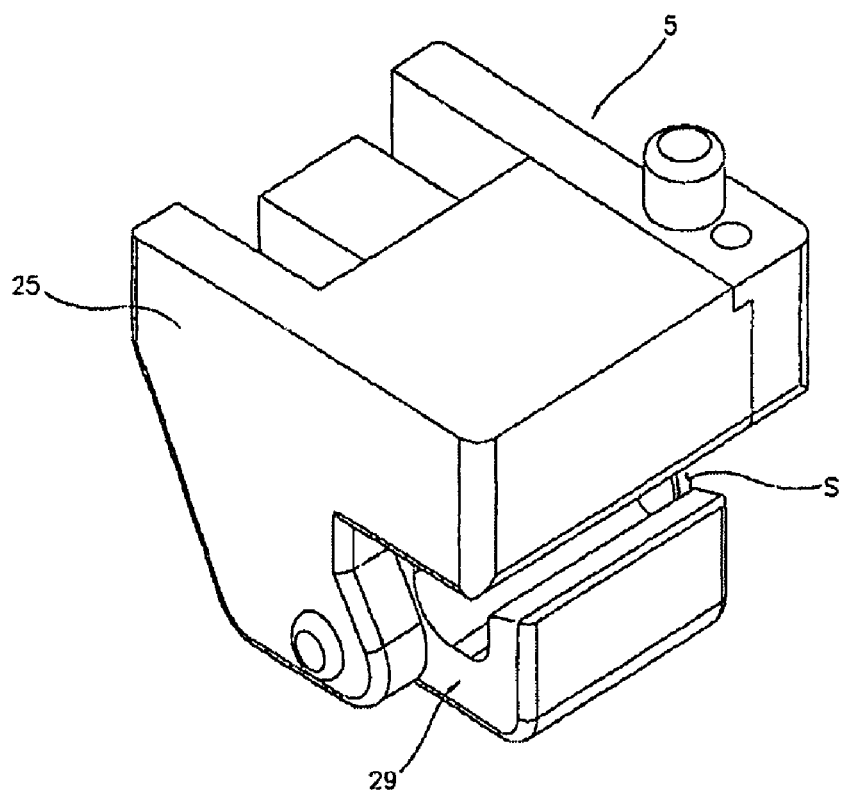

[Fig. 9]
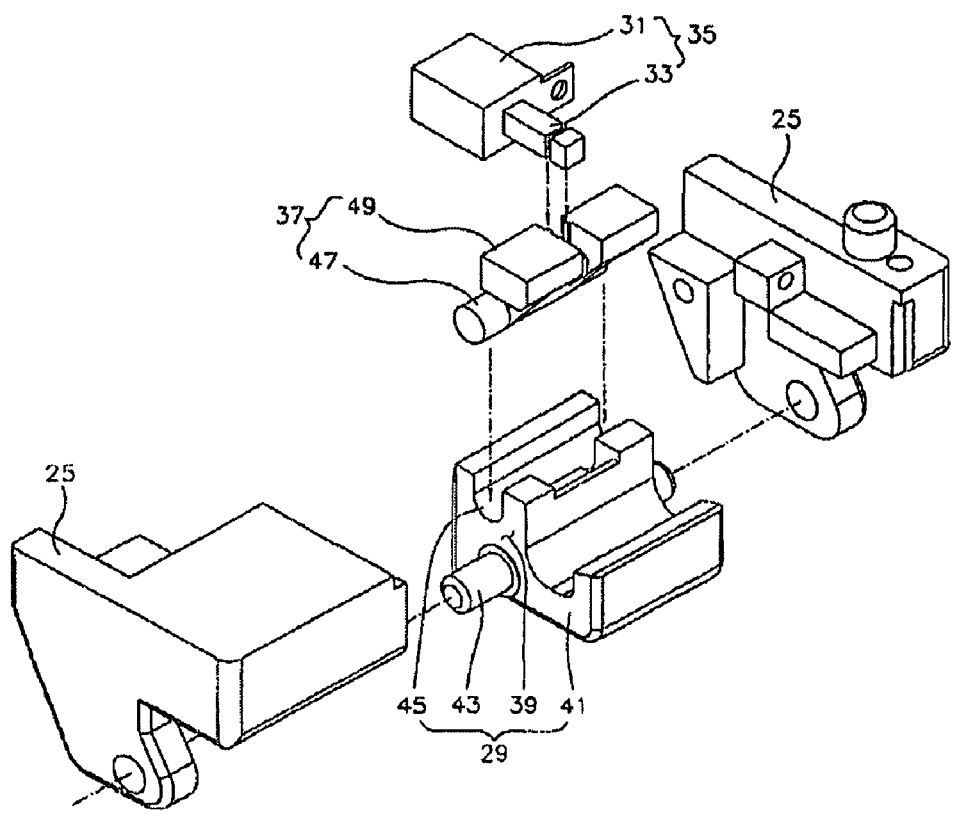
[Fig. 10]
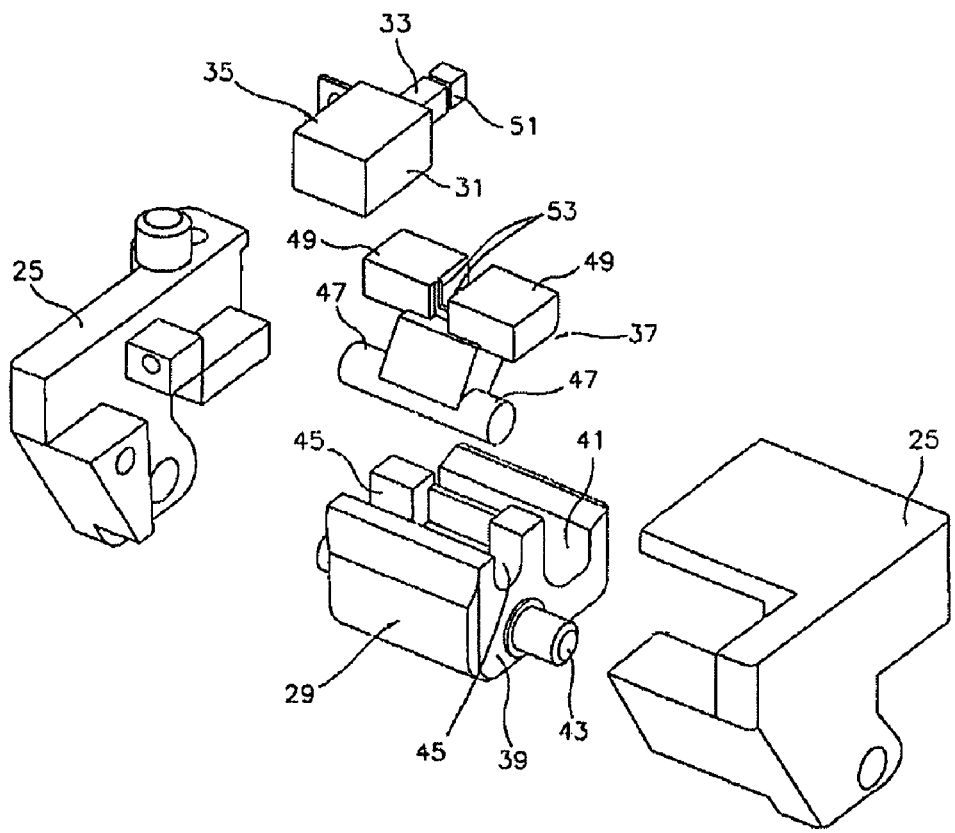

[Fig. 11]
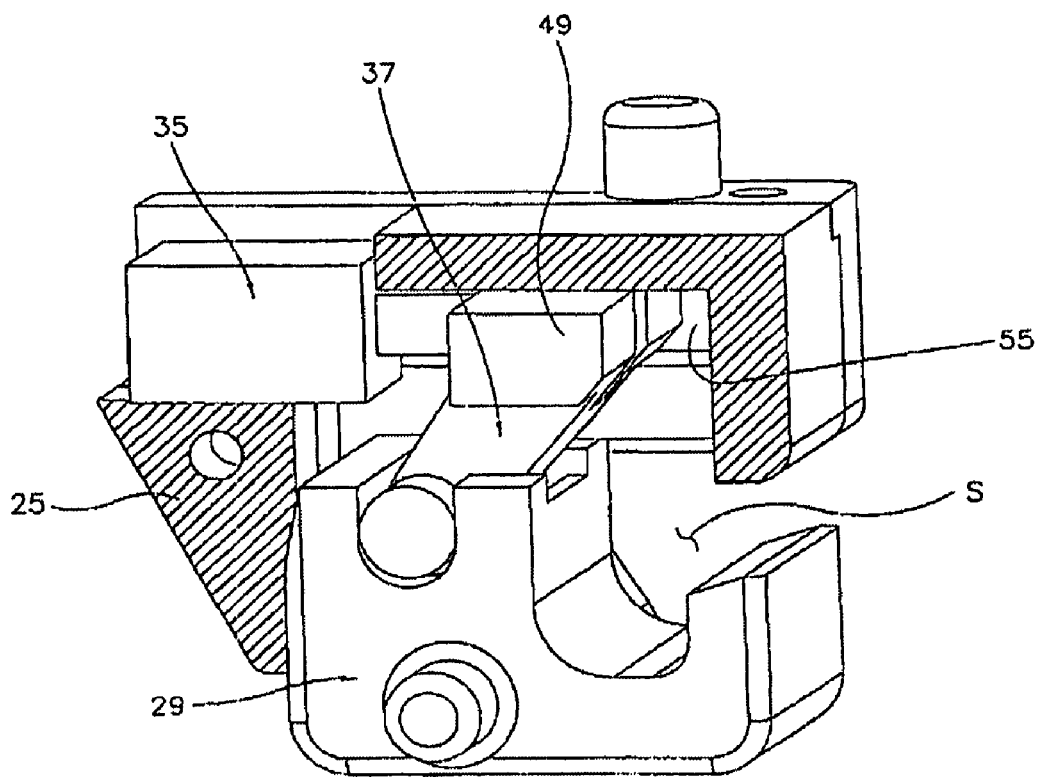
[Fig. 12]
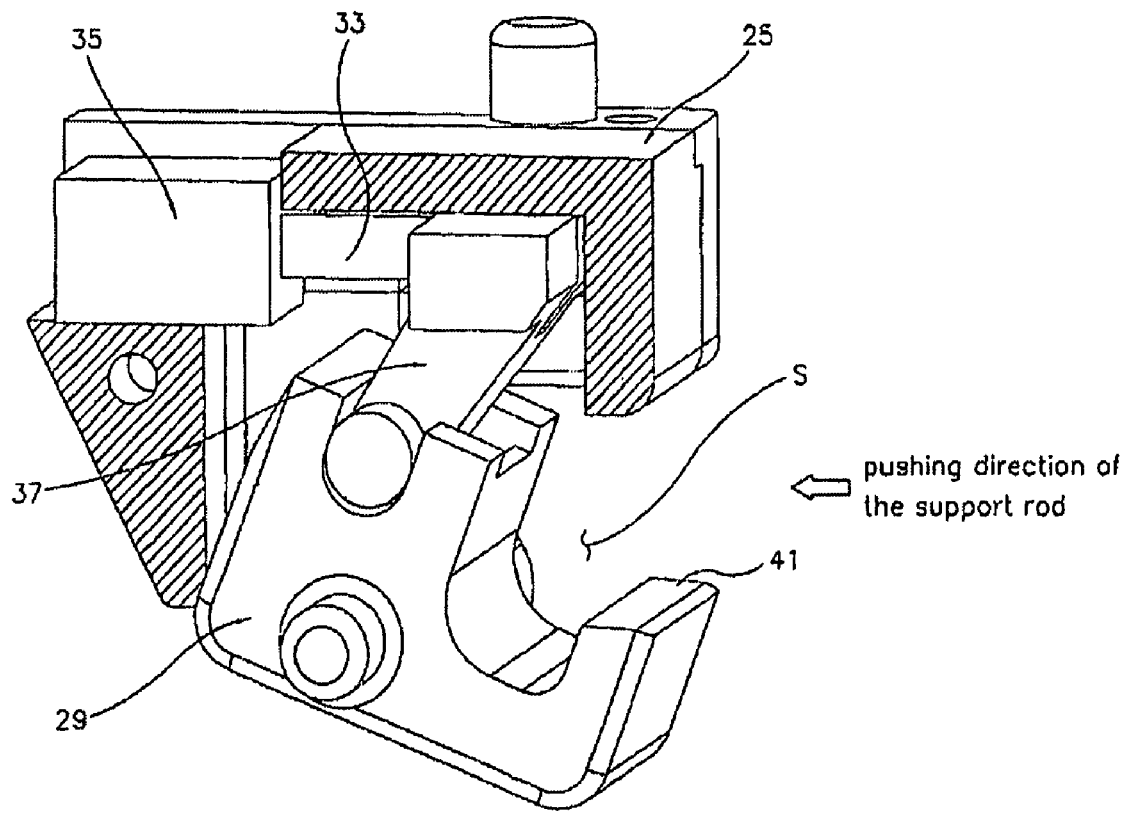
pushing direction of the support rod

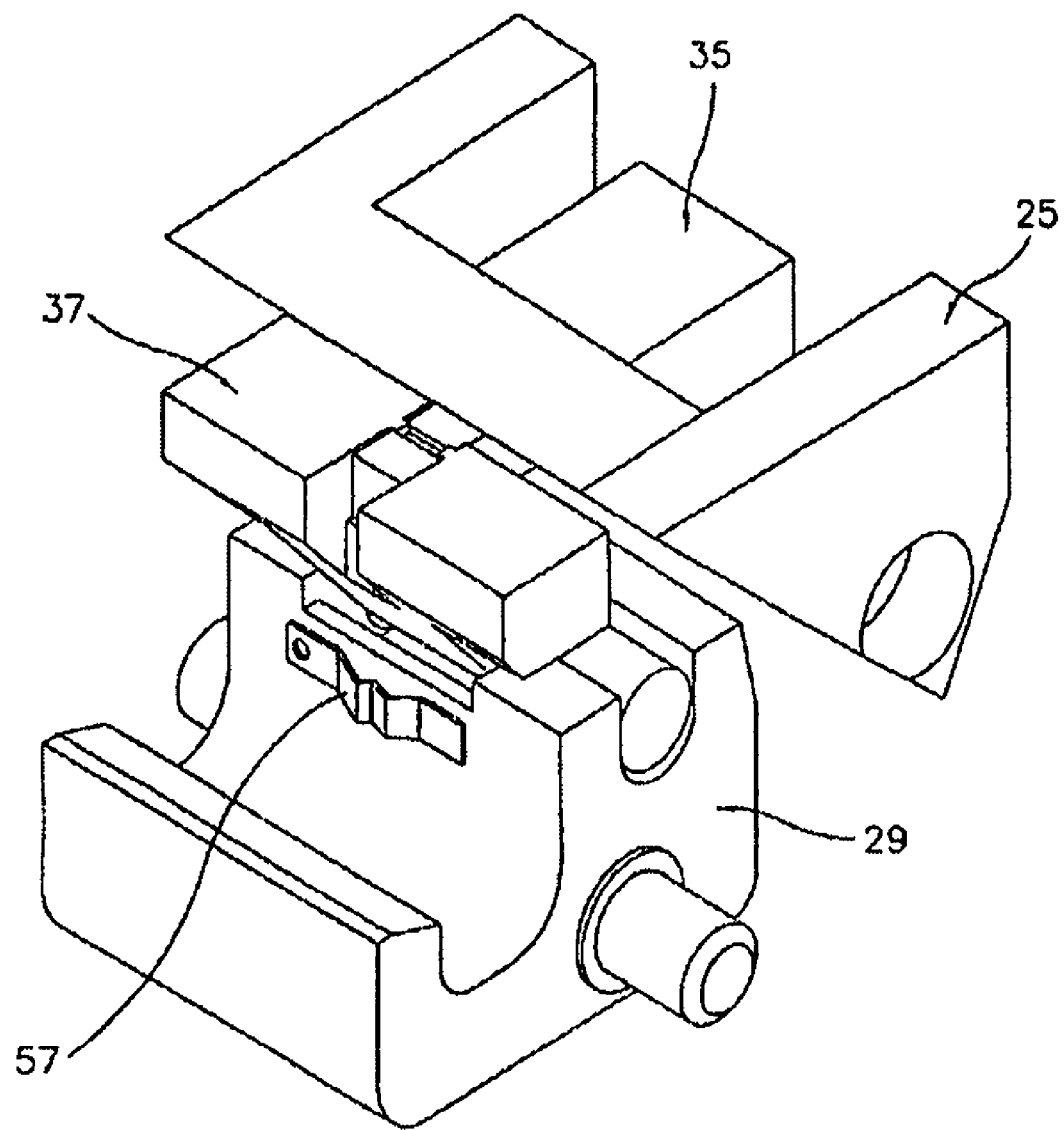
[Fig. 13]

SUNVISOR OF A VEHICLE

CROSS-REFERENCES TO RELATED APPLICATIONS

This application is a U.S. national phase application, pursuant to 35 U.S.C. §371, of PCT/KR2005/003897, filed Nov. 17, 2005, designating the United States and published on Nov. 30, 2006, as WO 2006/126764 A1, which claims priority to Korean application 10-2005-042902, May 23, 2005. The entire contents of the aforementioned patent applications are incorporated herein by this reference.

1. Technical Field

The present invention relates to a vehicle sunvisor improved in usage for a users convenience.

2. Background Art

Vehicular sunvisors are conventionally supported at one end edge of a visor panel via an "L" shaped pivot shaft to a head lining. The other end of the visor panel is equipped with a support rod that is inserted into a clip fixed at the head lining.

The visor panel is used to block against glare entering from the windshield or the side window using the pivot shaft. While blocking the front windshield of the vehicle, the support rod is inserted into the clip, and while shading the side of the vehicle, the support rod is separated from the clip for allowing the visor panel to shift by means of the pivot shaft.

Thus, in order to change the position of the visor panel, the support rod is maneuvered to be inserted into or withdrawn from the clip.

The support rod is typically in the shape of a circular stick. The clip is formed with a groove having a slightly small width than the maximal diameter of the support rod. As a result, when the user presses the support rod into the groove, the support rod is fixed in the groove of the clip.

Provided that the groove is largely formed, then the support rod may automatically be separated from the clip due to vehicle impact or vibration; therefore, the above groove is set relatively small in width for tightly supporting the visor panel.

However, the user should apply a large force to insert or withdraw the support rod from the groove of the clip, deteriorating the convenience of the manipulation (particularly, to the woman or the elder driver) and distracting the driver's attention while the vehicle is in motion.

DISCLOSURE OF INVENTION

Technical Problem

Embodiments of the present invention provide a visor panel relatively and easily attached and detached from a clip unit within a small force. Further, when a support rod is detached from the clip unit, the visor panel is automatically positioned to shade the side window, thus optimizing the convenience of using the sunvisor.

Technical Solution

A sunvisor of a vehicle according to one embodiment of the invention comprises a visor panel integrally equipped with a support rod. A clip unit is installed at the vehicle body for locking and releasing the support rod.

A sunvisor of a vehicle according to one embodiment of the invention comprises a visor panel integrally equipped at one side thereof with a support rod. A clip unit is installed at the vehicle body for locking and releasing the support rod. A panel guide unit is coupled at the other side of the visor panel for supporting the visor panel to die vehicle body. The panel guide unit forms a first pivot axis having a concentricity with the support rod whereby the visor panel can pivot about the support rod while the support rod is restricted in the clip unit. The panel guide unit also allows the visor panel to pivot on a second pivot axis and a third pivot axis at the same time, wherein the second and third pivot axes perpendicularly intersect with each other.

ADVANTAGEOUS EFFECTS

A visor panel is adapted to easily be attached and detached from a clip unit. Moreover, when a support rod is detached from the clip unit, the visor panel is configured to automatically be situated to shade the side window, thus optimizing the convenience of using the sunvisor.

BRIEF DESCRIPTION OF THE DRAWINGS

FIG. 1 illustrates a vehicle sunvisor in an original state according to one embodiment of the present invention;

FIG. 2 illustrates a front shading state of the sunvisor compared to FIG. 1;

FIG. 3 illustrates a conversion of the sunvisor from its original state to a side shading state in the order from the top to the bottom;

FIG. 4 is an exploded view of a panel guide unit according to one embodiment of the present invention;

FIG. 5 is a side view of FIG. 1;

FIG. 6 is a cross-sectional view taken along line VI-VI of FIG. 5 for depicting a structure of a guide groove;

FIG. 7 illustrates a torsion spring installed between a hub and a guide body;

FIG. 8 is a perspective view of a clip unit;

FIGS. 9 and 10 are exploded perspective views of a clip unit;

FIGS. 11 and 12 illustrate the operation of the clip unit; and

FIG. 13 illustrates another embodiment of the invention including a hook block with an elastic member.

MODE FOR THE INVENTION

FIG. 1 illustrates a sunvisor installed at a vehicle as an "Original state".

FIG. 2 illustrates a visor panel 1 rotated down from the state of FIG. 1 for insulating light incidence entering from the front of the vehicle and is called a "front shading state", hereinafter.

FIG. 3 illustrates a sequential motion of the visor panel for insulating light entering through the side window. When the visor panel is positioned as shown at the lowest portion of FIG. 3, the motion completed is called a side shading state.

Referring to FIGS. 1 4, 5, 6 and 7, an exemplary embodiment includes visor panel 1 integrally equipped at one side thereof with a support rod 3. A clip unit 5 is installed at the vehicle body for locking and releasing support rod 3. A panel guide unit 7 is coupled at the other side of visor panel 1 for supporting visor panel 1 to the vehicle body. Panel guide unit 7 forms a first pivot axis (A1) having a concentricity with support rod 3 whereby the visor panel can pivot about support rod 3 while support rod 3 is restricted in clip unit 5. Panel guide unit 7 also allows visor panel 1 to pivot on a second pivot axis (A2) and third pivot axis (A3) at the same time, wherein the second and third pivot axes (A2) and (A3) perpendicularly intersect with each other.

Visor panel 1 is supported by the vehicle body via panel guide unit 7 and clip unit 5. The imaginary line of FIG. 1 indicated as (B) where panel guide unit 7 and clip unit 5 are fixed may preferably be a roof panel, head lining or the like.

Panel guide unit 7 includes a bracket 9 fixed to the vehicle body (B). A guide body 11 is pivotably coupled to bracket 9 and forms the first pivot axis (A1). A hub 13 is pivotably coupled to guide body 11 and forms the second pivot axis (A2) as well as pivotably coupled to visor panel 1 and forms the third pivot axis (A3) perpendicular to the second pivot axis (A2). A guide rod 15 protrudes down from guide body 11 toward visor panel 1 and guides the movement of visor panel 1. A guide groove 17 into which guide rod 15 is inserted is formed at visor panel 1.

Panel guide unit 7 serves as a joint of visor panel 1 against the vehicle body. Thus, visor panel 1 can convert to the original state and the front shading state by being pivoted along the first pivot axis (A1). Also, visor panel 1 can convert to the original state and the side shading state by simultaneously being pivoted on the second pivot axis (A2) and third pivot axis (A3).

The detailed structure of panel guide unit 7 will be described below with reference to FIGS. 4 to 6. A roller 19 is mounted at a front end of guide rod 15 for being inserted into guide groove 17. Guide groove 17 restricts roller 19 from being escaped in the vertical direction of visor panel 1 by being narrowed down toward guide body 1, thus allowing only the longitudinal movement along guide groove 17. Guide groove 17 is in an arc-shape with a radius formed by a line from the second pivot axis (A2) to guide rod 15. While visor panel 1 is in parallel to the rotation plane formed via the second pivot axis (A2) and support rod 3 is restricted in movement by clip unit 5, guide groove 17 is configured to upwardly be slant from panel guide unit 7 toward clip unit 5 in relation to the rotation plane (see FIGS. 5 and 6).

Hence, when visor panel 1 pivots from the original state to the side shading state, roller 19 of guide rod 15 gradually moves downward by guide groove 17.

As shown in FIGS. 4 and 7, a torsion spring 21 is equipped between hub 13 and guide body 11 for providing resilient force toward the side shading state of visor panel 1.

By way of reference, a cover 23 may preferably be coupled onto guide body 11 as shown in FIG. 4, and thus, hub 13 and torsion spring 21 are placed inbetween.

The operation of panel guide unit 7 is as follows.

While clip unit 5 restrains support rod 3 of visor panel 1, visor panel 1 can pivot with guide body 11 in relation to the first pivot axis (A1) and the center of support rod 3 to thereby convert from the original state of FIG. 1 to the front shading state of FIG. 2 and vice versa.

If support rod 3 is separated from clip unit 5, visor panel 1 can pivot in relation to the second pivot axis (A2) of hub 13 due to the elastic force of torsion spring 21. Roller 19 of guide rod 15 relatively moves in guide groove 17 in response to the pivot of visor panel 1 and guides the movement of visor panel 1. Guide groove 17 induces visor panel 1 to gradually move downward through the contact with roller 19. Simultaneously, visor panel 1 pivots in relation to the third pivot axis (A3) by its own weight. As a result, the visor panel turns to the side shading state (see FIG. 3).

In order to restore visor panel 1 to its original state, the user should oppositely pivot visor panel 1 over the elastic force of torsion spring 21 and lock support rod 3 in clip unit 5.

The structure and operation of clip unit 5 will now be described below.

Clip unit 5 comprises a clip housing 25 fixed at the vehicle body (B). A hook block 29 is pivotably installed at clip housing 25 for restricting and releasing support rod 3 at a space (S) formed between hook block 29 and clip housing 25 corresponding to the pivot of clip housing 25. A block pivot means pivots hook block 29 for the restriction and release of support rod 3 when support rod 3 is pressed down toward the space (S).

Clip housing 25 can be separated into two parts, as illustrated in FIGS. 8 to 10, and assembled with hook block 29 and block pivot means therebetween.

In reference to FIGS. 9 to 12, the block pivot means includes a push lock device 35 and a connecting link 37, wherein push lock device 35 has a case 31 fixed to clip housing 25, and a slide bar 33 varying in length in response to the pressure applied uni-directionally. Connecting link 37 is installed between hook block 29 and slide bar 33 for converting a linear movement of slide bar 33 into a pivot movement of hook block 29.

Push lock device 35 is a common mechanism, wherein when slide bar 33 is pressed once, slide bar 33 is depressed into case 31 and then is protruded back when being repressed.

Push lock device 35 can preferably be a push lock type electric switch, which provides a sufficient force to protrude out the slide bar over the load applied.

In case of the electric switch, the electric terminal detects whether the visor panel is restricted in the clip unit by using the electric switching function of the electric switch. Alternatively, the electric switch can be used as an operation switch of a mechanism that activates panel guide unit 7 in an electric manner.

Hook block 29 comprises a body 39 and a hook portion 41, which protrudes out from body 39 to form an insertion space (S) of support rod 3 by being oppositely placed to a plane provided by clip housing 25. Hinge pins 43 protrude at both sides of body 39 for allowing body 39 to pivotably be supported at clip housing 25. A link supporter 45 allows connecting link 37 to relatively pivot.

Link supporter 45 and hook portion 41 are, respectively, formed with a U-shaped groove opened toward the upper portion of body 39.

Connecting link 37 includes a journal 47 having a circular section for being inserted into link supporter 45. A slide block 49 is assembled onto journal 47 and coupled to slide bar 33 for integrally moving with slide bar 33.

Slide bar 33 is provided with grooves 51 vertically formed in relation to the longitudinal direction of slide bar 33, and slide block 49 is provided with extrusions 53 inserted into grooves 51 of slide bar 33.

With reference to FIGS. 11 and 12, slide block 49 is stably guided along the linear movement of slide bar 33 on a linear guide portion 55 formed in clip housing 25.

As of the operation of clip unit 5, when hook portion 41 of hook block 29 is pressed from the state of FIG. 12, hook block 29 pivots with respect to pivot pins 43, and slide block 49 of connecting link 37 linearly slides along linear guide portion 55 to compress slide bar 33 of push lock device 35 as shown in FIG. 11.

Slide bar 33 of push lock device 35 is locked and retained in a depressed state. Therefore, support rod 3 accommodated into the space (S) between hook portion 41 and clip housing 25 is limited in lateral movement by clip unit 5.

If the user pushes visor panel 1 and support rod 3 re-presses hook portion 41 thereby, the pressing force is transmitted to push lock device 35 through connecting link 37, and slide bar 33 protrudes out from push lock device 35. Connecting link 37 linearly slides along linear guide portion 55 and hook block 29 pivots as shown in FIG. 12. Thus, support rod 3 of visor panel 1 is released from clip unit 5.

Provided that push lock device 35 provides a large force to hook block 29, then support rod 3 is released from the locked state, and simultaneously, is pushed out from the space (S) for a predetermined distance.

Under such situation, visor panel 1 is automatically converted into the side shading state by torsion spring 21 of panel guide unit 7.

Panel guide unit 7 can be implemented by a conventional L-shaped pivot shaft as another embodiment.

With the L-shaped pivot shaft, clip unit 5 restricts support rod 3 when support rod 3 is pressed into clip unit 5.

Consequently, the support rod can easily be inserted into and withdrawn from the groove of the clip unit in the above embodiments, resulting in an improvement of the user's convenience.

Yet another embodiment may preferably be incorporated with an elastic member at hook portion 41 for providing the resilient force to a place, where the pressure of support rod 3 is applied, in the direction of pushing out support rod 3.

As illustrated in FIG. 13, the elastic member may be a plate spring 57 that is fixed at one side thereof to hook portion 41 and has an uneven shape at the center thereof.

Plate spring 57 stores the energy when the user presses hook portion 41, and then provides the resilient force when support rod 3 is separated from clip unit 5, causing to a slight pivot of visor panel 1.

As apparent from the foregoing, there is an advantage in that the visor body of the sunvisor associated with a conventional L-shaped pivot shaft can easily be manipulated without recourse to a panel guide unit, thereby facilitating the conversion between the original state and the side shading state thereof.

The invention claimed is:

1. A sunvisor of a vehicle, comprising:
   a visor panel integrally equipped with a support rod; and
   a clip unit installed at a vehicle body for locking and releasing said support rod,
   wherein said clip unit comprises:
   a clip housing fixed at the vehicle body;
   a hook block pivotably installed at said clip housing for restricting and releasing said support rod at a space formed between said hook block and said clip housing corresponding to a pivot of said clip unit; and
   block pivot means that pivots said hook block for a restriction and release of said support rod when said support rod is pressed down toward the space.

2. The sunvisor as defined in claim 1, wherein said block pivot means includes:
   a push lock device that has a case fixed to said clip housing, and a slide bar varying in length in response to pressure applied unidirectionally; and
   a connecting link installed between said hook block and said slide bar for converting a linear movement of said slide bar into a pivot movement of said hook block.

3. The sunvisor as defined in claim 2, wherein said push lock device includes a push lock type electric switch.

4. The sunvisor as defined in claim 2, wherein said hook block comprises:
   a body;
   a hook portion protruding out from said body to form an insertion space of said support rod by being oppositely placed to a plane provided by said clip housing;
   hinge pins protruding at both sides of said body for allowing said body to pivotably be supported at said clip housing; and
   a link supporter allowing said connecting link to relatively pivot.

5. The sunvisor as defined in claim 4, wherein said link supporter and said hook portion are, respectively, formed with a U-shaped groove opened toward an upper portion of said body.

6. The sunvisor as defined in claim 5, wherein said connecting link includes:
   a journal having a circular section for being inserted into said link supporter; and
   a slide block assembled on said journal and coupled to said slide bar for integrally moving with said slide bar.

7. The sunvisor as defined in claim 6, wherein said slide bar is provided with grooves vertically formed in relation to a longitudinal direction of said slide bar, and said slide block is provided with extrusions inserted into said grooves of said slide bar.

8. The sunvisor as defined in claim 4, wherein said hook portion is further equipped with an elastic member for providing resilient force to a place, where pressure of said support rod is applied, in a direction of pushing out said support rod.

9. The sunvisor as defined in claim 8, wherein said elastic member includes a plate spring that is fixed at one side thereof to said hook portion and has an uneven shape at a center thereof.

10. A sunvisor of a vehicle, comprising:
    a visor panel integrally equipped at one side thereof with a support rod;
    a clip unit installed at a vehicle body for locking and releasing said support rod; and
    a panel guide unit coupled at the other side of said visor panel for supporting said visor panel to a vehicle body, said panel guide unit forms a first pivot axis having a concentricity with said support rod whereby said visor panel can pivot about said support rod while said support rod is restricted in said clip unit, and said panel guide unit allows said visor panel to pivot on a second pivot axis and a third pivot axis at the same time, wherein said second and third pivot axes perpendicularly intersect with each other.

11. The sunvisor as defined in claim 10, wherein said panel guide unit includes:
    a bracket fixed to the vehicle body;
    a guide body pivotably coupled to said bracket and forming said first pivot axis;
    a hub pivotably coupled to said guide body and forming said second pivot axis as well as pivotably coupled to said visor panel and forming said third pivot axis perpendicular to said second pivot axis;
    a guide rod protruding down from said guide body toward said visor panel and guiding a movement of said visor panel; and
    a guide groove into which said guide rod is inserted and being formed at said visor panel.

12. The sunvisor as defined in claim 11, wherein said guide rod is mounted at a front end thereof with a roller for being inserted into said guide groove; and
    said guide groove restricts said roller from being escaped in a vertical direction of said visor panel by being naffowed down toward said guide body, thus allowing only a longitudinal movement along said guide groove, wherein said guide groove is in an arc-shape with a radius formed by a line from said second pivot axis to said guide rod, and while said visor panel is in parallel to a rotation plane formed via said second pivot axis and said support rod is restricted in movement by said clip unit, said guide groove is configured to upwardly be slant from said panel guide unit toward said clip unit in relation to the rotation plane.

13. The sunvisor as defined in claim 10, wherein said clip unit comprises:
   a clip housing fixed at the vehicle body;
   a hook block pivotably installed at said clip housing for restricting and releasing said support rod at a space formed between said hook block and said clip housing corresponding to a pivot of said clip unit; and block pivot means that pivots said hook block for a restriction and release of said support rod when said support rod is pressed down toward the space.

14. The sunvisor as defined in claim 13, wherein said block pivot means includes:
   a push lock device that has a case fixed to said clip housing, and a slide bar varying in length in response to pressure applied unidirectionally; and
   a connecting link installed between said hook block and said slide bar for converting a linear movement of said slide bar into a pivot movement of said hook block.

15. The sunvisor as defined in claim 13, wherein said hook block comprises:
   a body;
   a hook portion protruding out from said body to form an insertion space of said support rod by being oppositely placed to a plane provided by said clip housing;
   hinge pins protruding at both sides of said body for allowing said body to pivotably be supported at said clip housing; and
   a link supporter allowing said connecting link to relatively pivot.

16. The sunvisor as defined in claim 15, wherein said link supporter and said hook portion are, respectively, formed with a U-shaped groove opened toward an upper portion of said body.

17. The sunvisor as defined in claim 16, wherein said connecting link includes:
   a journal having a circular section for being inserted into said link supporter; and
   a slide block assembled on said journal and coupled to said slide bar for integrally moving with said slide bar.

18. The sunvisor as defined in claim 17, wherein a torsion spring is further equipped between said hub and said guide body for providing resilient force toward a side shading state of said visor panel.

* * * * *